US 8,489,898 B2

(12) United States Patent
Wong

(10) Patent No.: US 8,489,898 B2
(45) Date of Patent: Jul. 16, 2013

(54) METHOD AND APPARATUS FOR INCLUDING ARCHITECTURE FOR PROTECTING MULTI-USER SENSITIVE CODE AND DATA

(75) Inventor: Daniel W. Wong, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 115 days.

(21) Appl. No.: 12/975,555

(22) Filed: Dec. 22, 2010

(65) Prior Publication Data
US 2012/0102333 A1 Apr. 26, 2012

Related U.S. Application Data

(60) Provisional application No. 61/405,045, filed on Oct. 20, 2010, provisional application No. 61/405,054, filed on Oct. 20, 2010.

(51) Int. Cl.
*G06F 21/00* (2006.01)
(52) U.S. Cl.
USPC ............ 713/192; 713/2; 726/3; 726/21
(58) Field of Classification Search
USPC .................. 713/2, 189, 192; 726/3, 21
See application file for complete search history.

(56) References Cited

U.S. PATENT DOCUMENTS

| 7,386,775 | B2 | 6/2008 | Birmiwal et al. |
| 2002/0184046 | A1 | 12/2002 | Kamada et al. |
| 2006/0015748 | A1 | 1/2006 | Goto |
| 2006/0090084 | A1* | 4/2006 | Buer ........................ 713/189 |
| 2008/0065547 | A1 | 3/2008 | Shimizu |
| 2008/0152142 | A1* | 6/2008 | Buer et al. ............... 380/270 |
| 2008/0229117 | A1 | 9/2008 | Shin et al. |
| 2008/0282345 | A1 | 11/2008 | Beals |
| 2009/0037682 | A1 | 2/2009 | Armstrong et al. |
| 2009/0249222 | A1 | 10/2009 | Schmidt et al. |
| 2009/0327703 | A1 | 12/2009 | Feudo et al. |
| 2011/0066835 | A1* | 3/2011 | Kothari et al. ............. 713/2 |
| 2012/0102307 | A1* | 4/2012 | Wong ........................ 713/2 |

FOREIGN PATENT DOCUMENTS

| EP | 1548537 A1 | 6/2005 |
| EP | 1826701 A2 | 8/2007 |
| WO | 199705551 A1 | 2/1997 |
| WO | 2006082988 A2 | 8/2006 |

OTHER PUBLICATIONS

Copy of International Search Report from PCT Application No. PCT/US2011/056895 dated Feb. 8, 2012.
Copy of International Search Report from PCT Application No. PCT/US2011/056902 dated Mar. 2, 2012.

* cited by examiner

*Primary Examiner* — Hadi Armouche
(74) *Attorney, Agent, or Firm* — Volpe and Koenig, P.C.

(57) ABSTRACT

A secure execution environment for execution of sensitive code and data including a secure asset management unit (SAMU) is described. The SAMU provides a secure execution environment to run multiple instances of separate program code or data code associated with copy protection schemes established for content consumption. The SAMU architecture allows for hardware-based secure boot and memory protection and provides on-demand code execution for multiple instances of separate program code or data provided by a host processor. The SAMU may boot from an encrypted and signed kernel code, and execute encrypted, signed code. The hardware-based security configuration facilitates the prevention of vertical or horizontal privilege violations.

22 Claims, 5 Drawing Sheets

METHOD AND APPARATUS FOR INCLUDING ARCHITECTURE FOR PROTECTING MULTI-USER SENSITIVE CODE AND DATA

CROSS REFERENCE TO RELATED APPLICATIONS

This application claims the benefit of U.S. provisional applications 61/405,045 and 61/405,054, both filed Oct. 20, 2010, the contents of which are hereby incorporated by reference herein.

FIELD OF INVENTION

This application is related to hardware-based security execution environments.

BACKGROUND

A robust technological enforcement of digital rights management (DRM) licenses assumes that prevention of direct access to the raw bit stream of decrypted digital content and that license enforcement mechanisms themselves is possible. However, this is difficult to achieve on an open computing platform such as a personal computer (PC).

PCs have been found to be difficult to make robust for maintaining confidentiality of sensitive code and data. Current methods of maintaining confidentiality of code or securing data include existing software based solutions that rely on anti-debugging, integrity monitoring, and obfuscation techniques to deter reverse engineering and tampering. Another technique involves authenticating software code and/or data constants that the system wishes to execute at load-time during a secure boot process. This may be accomplished, for example, via a signature verification technique as recognized by those having ordinary skill in the art. But load-time authentication techniques also suffer from drawbacks. For example, in this technique, the authentication only takes place once, during the secure boot process. Thus, a system utilizing a load-time authentication technique is susceptible to programming attacks and/or data corruption at run-time, where run-time is recognized as being the time period immediately following load-time (i.e., after the secure boot process).

Existing computing systems often attempt to protect the integrity of data stored in registers by implementing a credential-based security system. In such a system, access to registers (i.e., locations in memory that can be read/written) is restricted to those functions (i.e., software programs) whose credentials are verified. This verification may be accomplished by logic within the computing system. However, credential-based security systems suffer from a number of drawbacks. For example, credential-based security systems are only capable of enforcing one data-access policy. Specifically, a function with viable credentials will be permitted to access the data within the register while a function without viable credentials will be denied access to the data. Because these systems rely solely on credential-based verification as a mechanism for data access, they are susceptible to a scenario where a rogue function improperly obtains viable credentials and is therefore permitted to access the data sought to be protected. Furthermore, these systems assume that credential-based data access is the appropriate security policy for all types of data sought to be protected. However, it is often desirable to protect different types of data with different access policies.

Known techniques, such as those discussed above, are frequently not sufficient for use in DRM systems when they are implemented in software targeted to run on a regular PC. There are many tools available to make reverse engineering possible.

Additionally, in a PC, the protection architecture and the access control model of operating systems makes them cumbersome for use as a platform for a DRM content rendering client, because it is difficult to protect sensitive software code with an open architecture. Current methods to maintain confidentiality have been proven to be effective against casual hackers at the expense of high computational and power overhead. But high value assets are still difficult to guard against professional hackers. Therefore, there is a need to provide a secure execution environment in a personal computing environment for the execution of sensitive code and data.

SUMMARY OF EMBODIMENTS

Embodiments described herein include a security configuration provided for a hardware-based protected execution environment that allows multiple applications or on-demand sensitive code to be loaded into the secure execution environment at the same time. Run-time generated data may be securely protected even when stored in external memory. Each memory context is separately managed, insuring confidentiality between the respective contexts. The execution environment includes architectural details of a secure asset management unit (SAMU). The SAMU provides a secure execution environment for program code or data by offloading code or data from a host processor in an encrypted format for authenticating and for maintaining confidentiality of the code or data. The SAMU reduces power consumed by providing a platform for tamper resistant software, and reduces frequency of revocation of valid software. Also, the SAMU is non-intrusive to honest users but provides a protected execution environment to make reverse engineering of sensitive code difficult. The hardware-based security configuration facilitates the prevention of vertical or horizontal privilege violations.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

It is noted that this application incorporates the entirety of U.S. Nonprovisional application Ser. No. 12/964,278 as if fully set forth herein.

The term "processor" as used herein refers to any of: processor, processor core, central processing unit (CPU), graphics processing unit (GPU), digital signal processor (DSP), field programmable gate array (FPGA), or similar device. The processor may form part of another device, e.g., an integrated north bridge, an application processor (Apps Processor), a CPU, a DSP, or the like. A processor core as used herein may be an x86, RISC, or other instruction set core.

A secure asset management unit (SAMU) is a component configured either within a processor core or is a separate component configured to perform in tandem with a processor core. When configured in a processor core or as a separate component from the processor core, a SAMU may be configured to perform at least one of: offloading sensitive code from a host processor or encrypting sensitive code or data in memory.

The SAMU may be implemented in hardware to provide a hardware-based protected execution environment. In such an environment, sensitive code and data may be protected in a secure memory and may be stored in plaintext form only in caches or embedded memory. Furthermore, debugging is completely disabled on production parts; and a secure kernel "owns" and controls the execution environment, and access to memory and resources are all controlled. The SAMU may share a memory with the processor or it may have a dedicated memory.

Figure 1A:
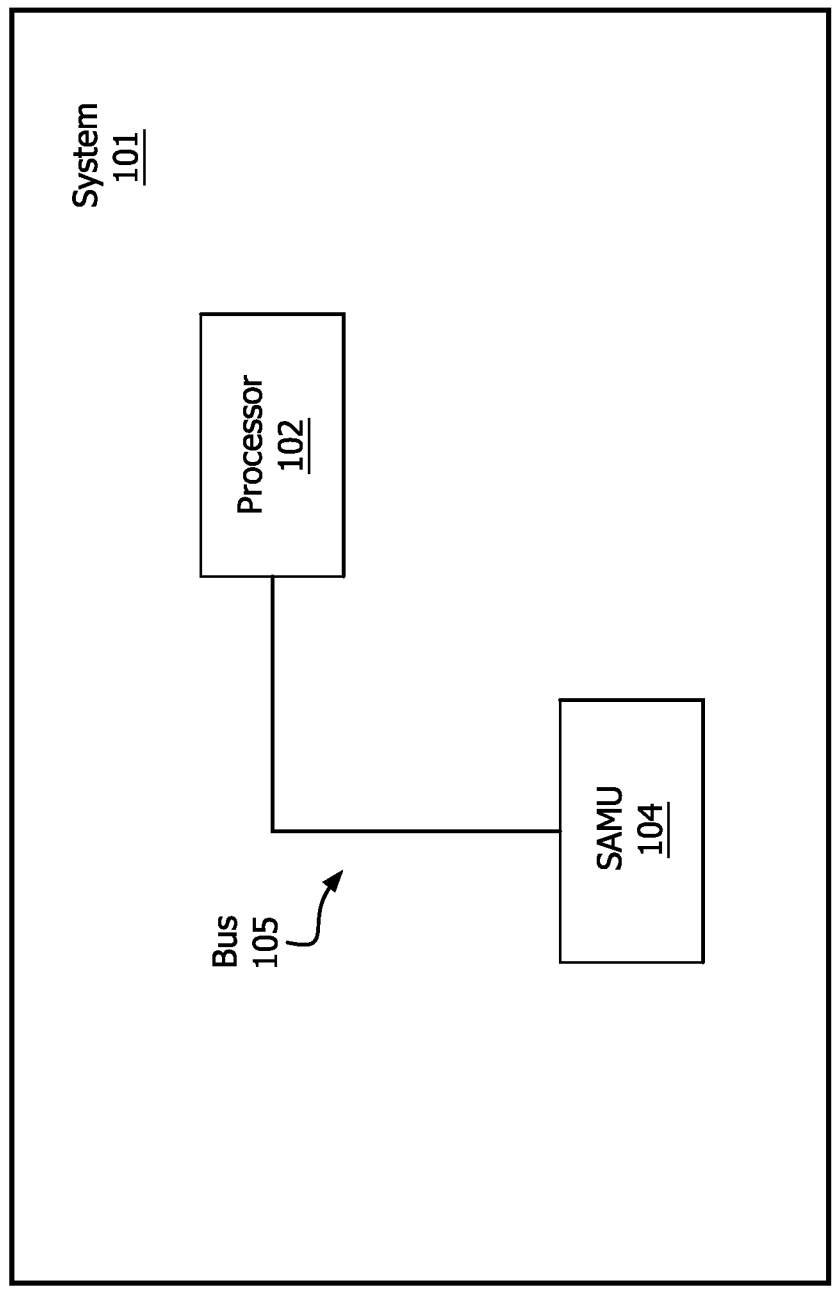
FIG. 1A shows a host system in accordance with one embodiment where sensitive code is offloaded from a processor to a secure asset management unit (SAMU)

FIG. 1A shows a host system 101 in accordance with one embodiment where sensitive code is offloaded from a processor to a SAMU. FIG. 1A shows a system 101 including a processor 102 and a SAMU 104 connected via a system bus or internal bus 105. The system 101 is used to perform offloading of secure code from the processor 102 to the SAMU 104. The system 101 may be any computer system capable of exchanging data with a peer. Further, the system 101 may include one or more applications (not shown) that use a secure protocol to transfer data between the processor 102 and the SAMU 104. The applications may be running in kernel space or user space.

The processor 102 is configured to operate in a system kernel (not shown). The processor 102 interfaces with external devices to retrieve encrypted data and messages (i.e., packets) from a content source (e.g., content media such as a Blu-ray™ disc, from the Internet, etc.). The processor 102 may provide encrypted data to the SAMU 104 for decryption and processing. Some data sets, for example, navigation data, may be returned from the SAMU 104 to the processor 102 to control the overall media consumption process. The SAMU 104 may also send data back to the processor 102 in re-encrypted format when protection is required.

In one embodiment, the SAMU 104 includes a processing stack configured to enable processing of data sent to and received from an external device. Thus, when the system 101 establishes a connection with the external device or the Internet, rather than the host processor 102 processing the packets sent and received, the SAMU 104 provides this processing functionality via the processing stacks implemented on the SAMU 104.

In another embodiment, the SAMU 104 may be a part of processor 102.

Figure 1B:
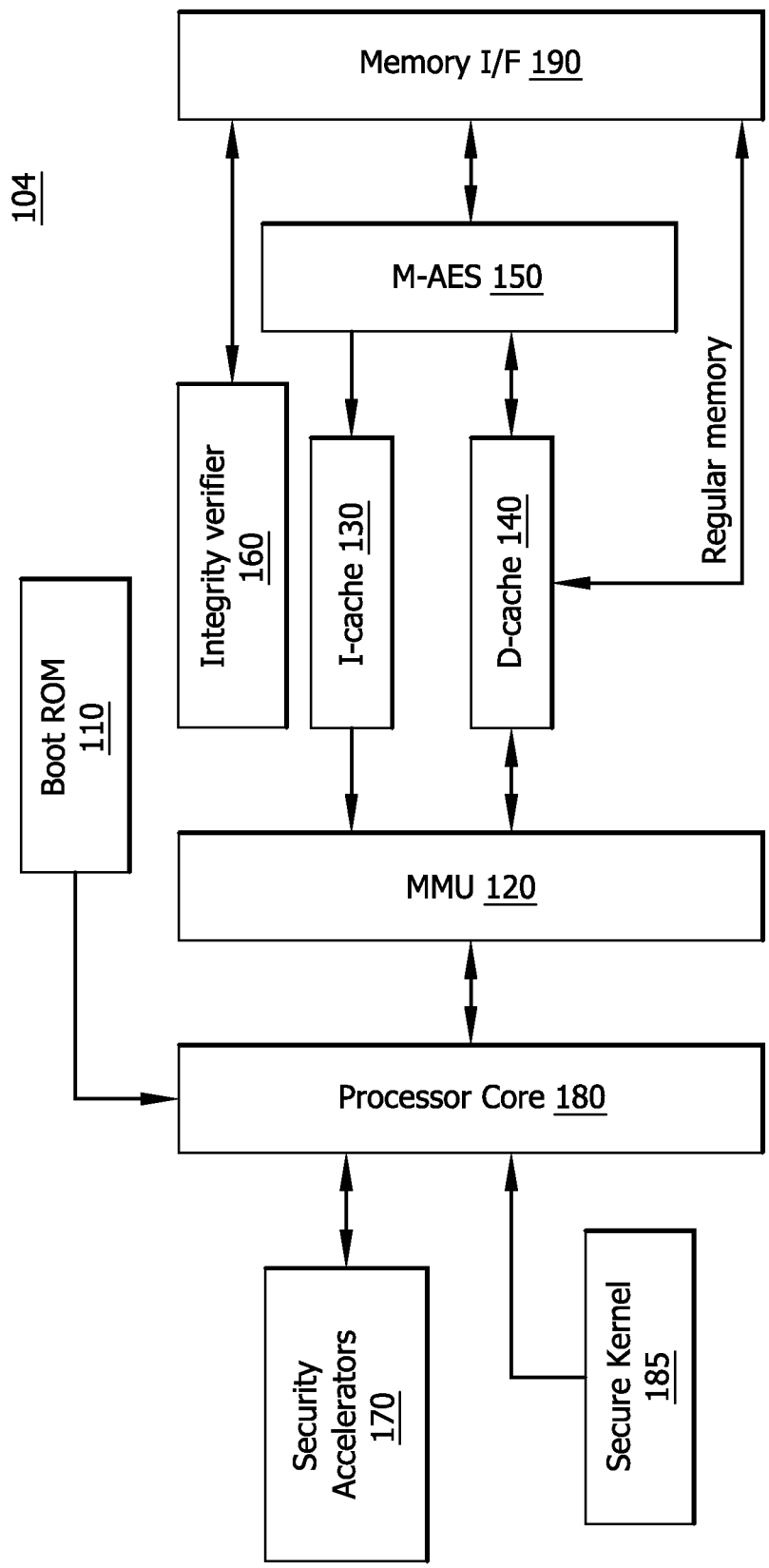
FIG. 1B shows a SAMU top level architecture.

The architecture for the SAMU 104 is explained in greater detail with respect to FIG. 1B. The SAMU 104 includes a secure boot read only memory (ROM) 110, a memory management unit (MMU) 120, an instruction cache (I-Cache) 130, a data cache (D-Cache) 140, a memory Advanced Encryption Standard (M-AES) component 150, an integrity verifier (IV) 160, security accelerators 170, a processor core 180, a secure kernel 185, and a memory interface 190. The security accelerators 170 are configured to implement at least one of: 128b/192b/256b AES; Secure Hash Algorithm (SHA-1/-2); Rivest, Shamir and Adleman (RSA) cryptography; elliptic curve cryptography (ECC) arithmetic; Data Encryption Standard (DES); 3DES; Rivest Cipher 4 (RC4); 1024b/2048b/3072b modular exponentiation; or provide a true random number generator.

The SAMU 104 may support multiple processor modes, including a mode for boot code in silicon. Other processor modes may be defined by secure kernel 185, including for example: kernel core functions; kernel services; in-house developed SAMU 104 applications; third-party developed SAMU 104 applications; signed but in-the-clear SAMU 104 applications; or unsigned in-the-clear SAMU 104 applications.

The boot ROM 110 is configured to execute boot code in silicon form to perform debug management, to check for integrity of a given kernel, and to set up memory AES, and then pass control to the kernel (that passed integrity check), wherein the embedded processor comes out of reset configured to run the boot code. The boot code is further configured to configure or re-configure debugging facilities based on e-fuse technology (e.g., disable access to all debug facilities for production parts or an e-fused pattern injected at manufacturing that involves etching or hard-coding computer logic onto a chip that cannot be changed after the chip is manufactured); wait for SAMU 104 kernel initialization, where a SAMU driver presents the secure kernel 185 for loading; and employ the integrity verifier (IV) hardware 160 to validate the integrity of a given image. The IV hardware 160 may be configured to generate a hash code from a given image and compare that hash code with the hash code attached to the image. If the generated hash code and the attached hash code match, the IV hardware 160 provides a PASS report, otherwise, reports a FAILURE.

The boot ROM 110 is further configured to prepare an environment for secure kernel 185 after successful integrity check, and pass control to the secure kernel 185. The secure kernel may use the same IV hardware 160 to revalidate itself periodically.

The boot ROM 110 may be provided as part of the chip in silicon form or stored securely in external ROM. The secure kernel 185 (encrypted and signed) may be provided as part of a SAMU driver, wherein the secure kernel 185 is configured to provide control access to resources in the SAMU (security policy); control access to SAMU cycles (job scheduling); connect the SAMU driver running on a host or on a SAMU application running on the SAMU; and construct/deconstruct SAMU memory or other contexts on demand.

To provide maximum code protection, different SAMU codes from different applications run on different contexts. Each code image is encrypted and hashed differently by a signing tool, wherein an encryption key is randomly generated during signing. Additionally, an integrity check is applied on the encrypted image before accepting an image for execution.

The M-AES 150 provides modulated (with additional proprietary scrambling in hardware) AES decryption on read, and modulated AES encryption on write (contents in cache or in embedded internal memory are in plaintext); there may also be a bypass mode as a pass-through for regular memory access (configured via the MMU). Memory AES keys may be generated by the boot ROM code or the secure kernel 185 and are provided to hardware for protecting sensitive code and data going through the memory interface. Content is plaintext only in the instruction cache 130, the data cache 140, or in an internal embedded memory. The sharing of code and data keys for the same context may also be possible. The secure kernel 185 may also use random bits to initialize data keys at context creation time to thwart replay attacks.

Sensitive data established at run-time is usually protected by run-time generated random keys. The random keys may be protected in two ways. In one way, the sensitive data, intended for external consumption (e.g., host or decode accelerator in a processor), is encrypted in standard AES. In a second way, the sensitive data, intended to stay inside the secure execution environment, is encrypted by the M-AES 150. The M-AES operation involves modulation with hardware generated modulations before and after the otherwise standard AES processes.

In an alternate embodiment for providing additional security, to protect memory traffic coming from the SAMU, the M-AES 150 applies further modulation with additional proprietary scrambling in hardware before and after the otherwise standard AES operations, which makes reverse engineering difficult. Sensitive code and data may therefore be stored and protected in existing frame buffer memory or system memory. Different random keys may be generated for protection of data segments and there may be no sharing of code and data keys.

In another embodiment for providing additional security, each code image is encrypted and hashed by a signing tool, wherein an encryption key is randomly generated during signing (this part of the process occurs at the vendor or third-party software provider). The decryption key for secure kernel 185 is computed and restored by the boot code in boot ROM 110, and the decryption key for a SAMU application is computed and restored by the kernel. Additionally, an integrity check is applied (on the encrypted version) by the IV 160 before accepting an image for execution.

Context or memory management is performed by the secure kernel 185 with the help of the MMU 120. The MMU 120 is configured to perform address translation logic that maps the processor 180 virtual address space to device address space (e.g., a graphics processor, a digital signal processor, or an FPGA). The MMU 120 supports up to 16 non-overlapping address segments with four AES keys. One possible arrangement is to assign two keys for secure kernel 185 (one for code and one for data) and the other two keys for a SAMU application (one each for code and data). In this configuration, all data segments belonging to the same context that need to be memory AES protected can only be protected with the same data key. Each segment may be independently configured for: memory size; memory AES protection, whether or not it is executable (e.g., a no execution flag); and access control (minimum processor mode for read/write access). Each memory segment must be contiguous in virtual address space. Not all segments are protected by memory AES encryption. In particular, buffers for communication between the SAMU 104 and the external devices or the Internet may only be protected by standard AES and therefore should be configured with the M-AES 150 turned off.

The secure kernel 185 is the only agent allowed to configure the MMU 120. Before switching to a new context (to serve the next SAMU operation or application), the secure kernel 185 unmaps all segments that belong to the previous context from MMU 120, and reconfigures MMU 120 to map all segments that belong to a target context. To perform this process, the secure kernel 185 may need to flush the data cache to commit all cache data back to memory and update the memory AES keys with those for the target context.

Access to memory is via memory interface 190. The SAMU 104 and its respective components are treated as a regular client from the perspective of the device (e.g., processor including a CPU, a GPU, a DSP, or an FPGA or other similar devices). The SAMU 104 relies on the M-AES 150 to provide memory protection to sensitive code and data.

The secure kernel 185 may include additional security services to provide the following coverage: establish a secure tunnel with external components; key exchange with a Digital Rights Management (DRM) block; unwrap a license key, device key or a content key; demultiplex bit-streams; decrypt or re-encrypt bitstreams; operate as a Virtual Machine, for example, BD+, a component of the Blu-ray™ disc DRM system; or data submission for audio/video (A/V) acceleration using existing paths.

The secure kernel 185, once loaded and in control, is responsible for the SAMU execution environment. In case security services are loaded on demand (instead of being an integral part of the kernel), the kernel is also responsible for checking the integrity of the on-demand code and setting up the right decryption key for these on-demand services. The key derivation process for on-demand code is determined by kernel engineering processes and may change from product/device generation or manufacturing technology. (A product/device generation is the scale at which a device is manufactured. For example, a processor may be manufactured using 90 nanometer (nm) or 65 nm technologies.) But each time the kernel changes its key derivation algorithm, the offline signing tool for user code must be modified to match that flow in the encryption process.

The processor, coming out of reset, boots from ROM code in silicon. Boot strap code is constructed to inspect for integrity of a given encrypted kernel before restoring the decryption key and transferring control to it. Integrity verification is performed by dedicated hardware logic in the integrity verifier 160. The offline signing tool for the secure kernel has a cryptographic setup that matches the integrity verification hardware as well as the key restoration mechanism hardcoded in the boot ROM 110. The choice of hash function for encryption or key generation is not critical and may be based on chaining of one-way AES operations.

The architecture of the SAMU 104 is such that it is capable of executing millions of instructions per second (MIPS), with cipher requirements, and may support cipher acceleration including the AES, DES, SHA1, and other algorithms. The SAMU 100 architecture supports all or a subset of the following: a true random number generator and a pseudo random number generator, secure timer, a instruction/data cache with memory management, multiple execution modes (or protection levels), address range enforcement (configured by the kernel), boot-strap code validation, and additional developmental tools.

Having a hardware-based page table improves both security and performance. But it may be expensive for a system to support the four kilo (K)-byte page size typically used by most operating systems as additional dedicated memory is required. This support issue is justified by the secure execution unit described herein. In one embodiment, a one mega (M)-byte page size is used as a starting point. The hardware page table mechanism may support any power-of-2 page sizes from one M-byte to four giga (G)-byte. Alternately, other page sizes may be supported (e.g., 4K-byte, 8K-byte, 16K-byte and other power-of-2 page sizes).

The page table may include other security properties in addition to address translation. For example, it may include a data structure to indicate one or more of the following: whether a page entry is active or disabled, whether a page contains data or code, separate read access and write access controls, a cipher flag to turn on or off memory AES, or a key index when memory AES is needed.

Page table information indicating whether a page (or segment) contains code or data is mostly a security issue and may not be essential to support multiple contexts. By informing the kernel that a page is intended for data storage, the kernel may trap any attempt to execute code from that page. This information also helps to facilitate effective mechanisms to trap buffer-overrun attacks.

Read and write access controls, defined on a per page (or segment) basis, specifies the minimum protection ring within which code is executing, before read and/or write access to that page (or segment) may be granted. This prevents a vertical privilege violation, which occurs when an application (e.g., a user application) assigned at a lower privilege gains read/write access to pages belonging to another process (for example, the kernel) running at a higher privilege. Typical processor architectures utilize various levels of protection/privileges to separate and control functions and processes (e.g., a process must have a certain (predefined) protection level to access a certain data structure or code segment).

A cipher flag denotes whether the cache to memory interface may turn on the M-AES 150 or not. The M-AES 150 has hardware modulation applied before and after AES operations. Information protected by the M-AES 150 is intended for consumption inside the SAMU-sensitive code to be executed by the secure execution environment and/or sensitive data used only by confidential functions running inside that environment. For pages marked with the cipher flag set in the page table entry, the hardware automatically applies decryption for all memory read operations into the instruction cache or the data cache, and applies encryption for memory writes as cache lines are flushed.

Different page entries in MMU 120 may be associated with different cipher keys. In one embodiment, four active cipher keys may be supported at any point in time (in alternative embodiments, any number of keys may be supported). Each page entry may specify the index of the key hardware that may be used for both encryption and decryption. This allows kernel code/data and user code/data to be protected with independent keys. Boot code is responsible for restoring the kernel code key, while the kernel is responsible for restoring the user code key. The kernel is also responsible for runtime generation of all data keys.

In an alternate embodiment, the code keys are connected with a signature in an integrity verification mechanism by having both of these functions take e-fused values as part of their inputs. By connecting the decryption key with the integrity verification mechanism, SAMU tampering is rendered difficult.

Ultimately, the configuration space of all these resources—page table entry and memory AES keys—have to be controlled. Read/write access to the configuration is guarded by separate access control fields in the control status register. Code may need to be in the proper protection ring before it may modify these configuration settings.

This hardware-based virtual memory support and the associated security setup described provides a robust solution for protecting sensitive code and data for use together with modern PC-based operating systems. This eliminates the computation and power/thermal overhead associated with software-based tamper proofing and obfuscation.

Figure 2:
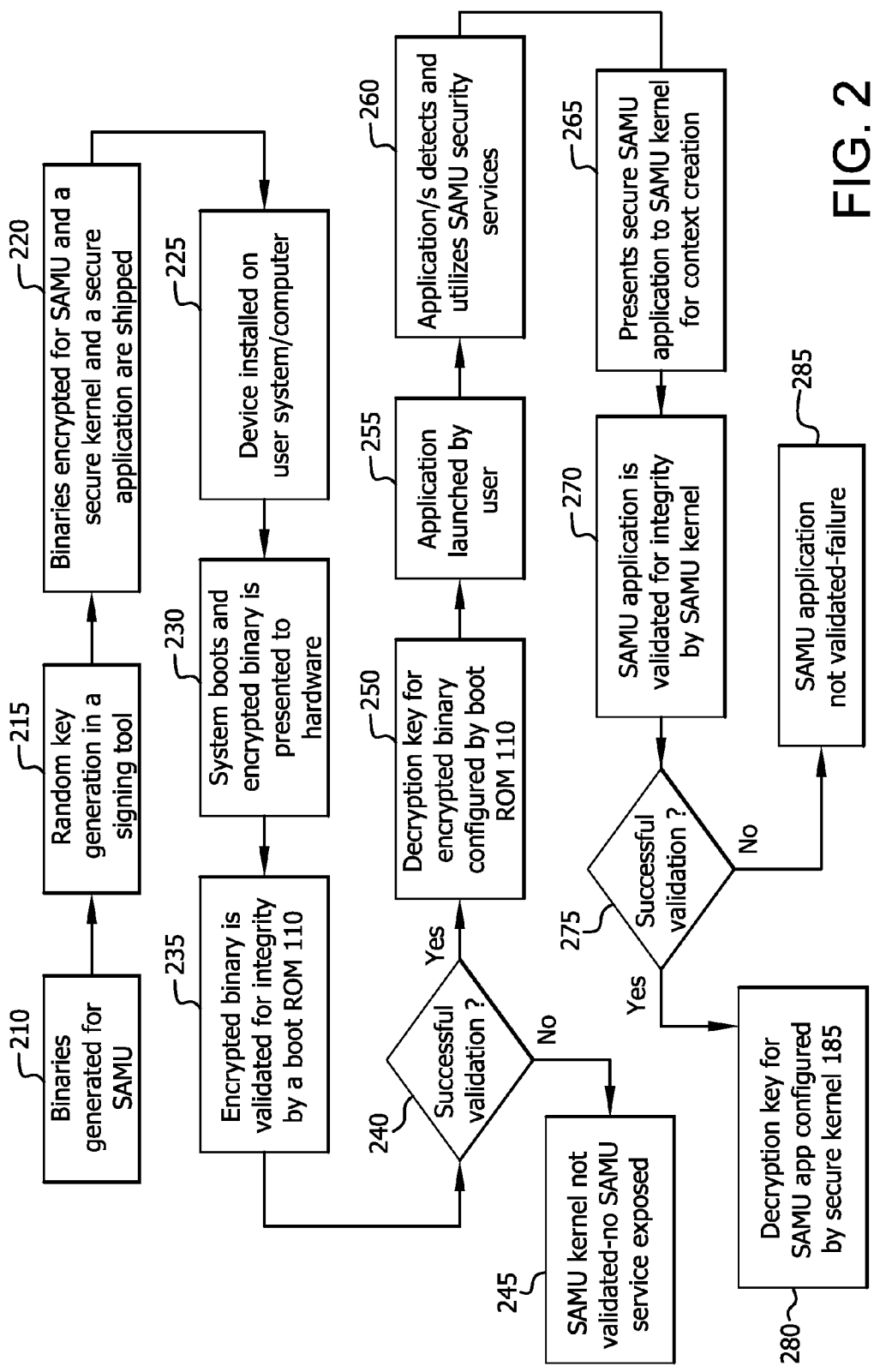
FIG. 2 is a flow diagram for a multi-application SAMU run-time context setup.

FIG. 2 is a flow diagram for a single application when using the SAMU architecture. Binaries are generated for the SAMU (step 210). A random key is generated in the signing tool (step 215). The binaries are encrypted for the SAMU (step 220) and include shipping a secure kernel as a part of a GPU's display driver, for example. A user may install the driver and the application on the user's computer/system bringing the secure kernel (display drivers) and the secure application together (step 225). At boot time, the secure kernel 185 is presented to the SAMU hardware (step 230). The secure kernel is verified and validated for integrity by the boot ROM 110 (step 235). The boot ROM 110 validates the secure kernel 185 integrity (step 240) before configuring the decryption key in the memory AES (to perform on-demand decryption of the encrypted code) and passing control to the secure kernel 185. If the secure kernel fails validation (step 245), no SAMU service is exposed and the application falls back on a software-based protection scheme. Upon successful validation, a decryption key for the secure kernel is configured by the boot ROM 110 (step 250).

An application is launched by a user (step 255). When the application is launched, the application detects the presence of SAMU services (step 260) and prepares itself to take advantage of the protected execution environment offered by the SAMU. The application presents a secure SAMU application to the secure kernel for context creation (step 265). The SAMU application is validated for integrity by the secure kernel 185 (step 270). The secure kernel 185 configures the IV hardware 160 to check for integrity of the SAMU application (step 275). A decryption key for the SAMU application is configured by the secure kernel 185 after a successful integrity validation (step 280). If the IV hardware 160 is not able to validate the SAMU application (step 275), the SAMU application is not accepted to run and a corresponding failure message is returned to the application (step 285). In this case, the application may choose to fall back to software-based protection techniques.

Offloading code or data to the SAMU for hardware acceleration as described above is similar to decode offloads and 3D rendering offloads. For example, applications use APIs to offload well-defined work items to a GPU.

The SAMU 104 provides a secure execution environment by providing a secure boot, integrity check, execution encrypted code, memory protection for sensitive data used by sensitive functions; and disabling debugging for production chips. There are at least two different kinds of code within the secure environment, for example, kernel code or application code, and boot strap code.

The boot strap code is stored encrypted in a secure storage and is shipped along with the final chip. It offers three major services at boot: disabling debugging for production chips, checking the integrity of the kernel image provided by the SAMU driver, and computing the decryption key for the given kernel before passing control to the kernel.

The decryption key is computed as part of the boot process, and is done only after a successful verification of the integrity of the kernel image. The decryption key is a function of multiple inputs: an e-fused pattern injected at manufacturing that involves etching or hard-coding computer logic onto a chip that cannot be changed after the chip has been manufactured, a random pattern generated at the kernel binary signing (stored as part of the signed kernel image), and software parameters provided at boot time by the SAMU driver. Computing of the kernel decryption key also involves access to secret functions embedded in silicon which may include secret multipliers, DSP blocks, processors, high speed IO logic, and embedded memories.

The kernel code serves as the manager for the SAMU 104 and provides services to the SAMU driver. The kernel code may include a manufacturer kernel certificate and is integrity enforced by a boot-loader. It controls SAMU resources and has register level access to both the SAMU and the processor. It can also load additional application code to offer on-demand services at runtime. The secure kernel 185 handles driver calls and invokes firmware routines accordingly.

Figure 3:
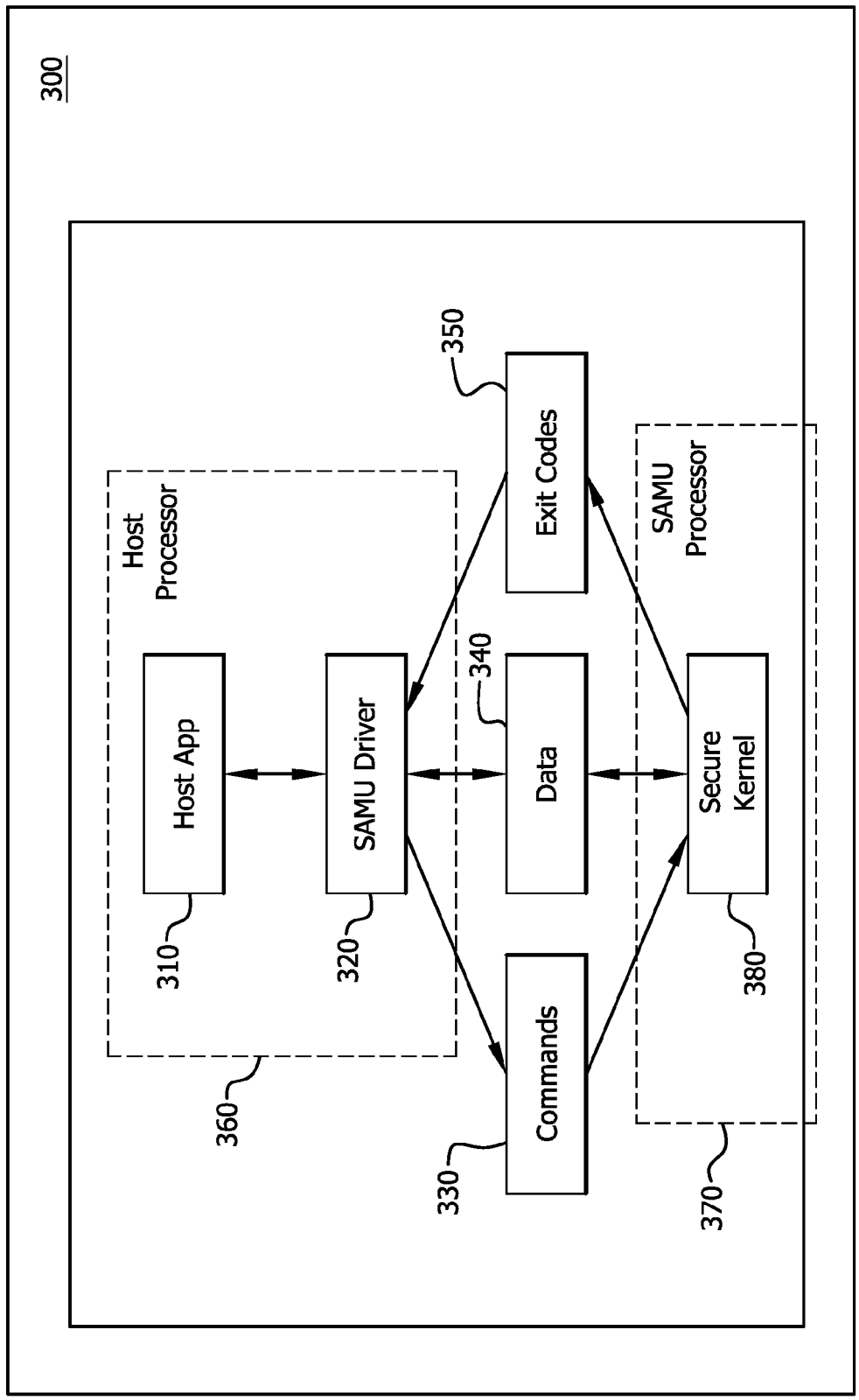
FIG. 3 shows a SAMU software stack.

FIG. 3 describes the SAMU software stack 300. A host application 310 and a SAMU driver 320 reside on the host processor 360 (e.g., a personal computer, smart phone, etc.). Based on requests coming from the host application 310, the SAMU driver 320 issues commands 330, and transfers corresponding data 340 to the secure kernel 380 of the SAMU processor 370 (e.g., in the processor core or in a GPU). The secure kernel 380 may receive data from multiple application processes, such as a SAMU application. This data may include code, application data, and the respective keys and signatures (embedded by the signing tool). The secure kernel 380 may pass processed data 340 back to the SAMU driver 320, which in turn passes the information to the host application 310. Alternatively, the secure kernel 380 may pass exit codes 350 to the SAMU driver 320 which will ultimately be passed to the host application 310 for processing.

Figure 4:
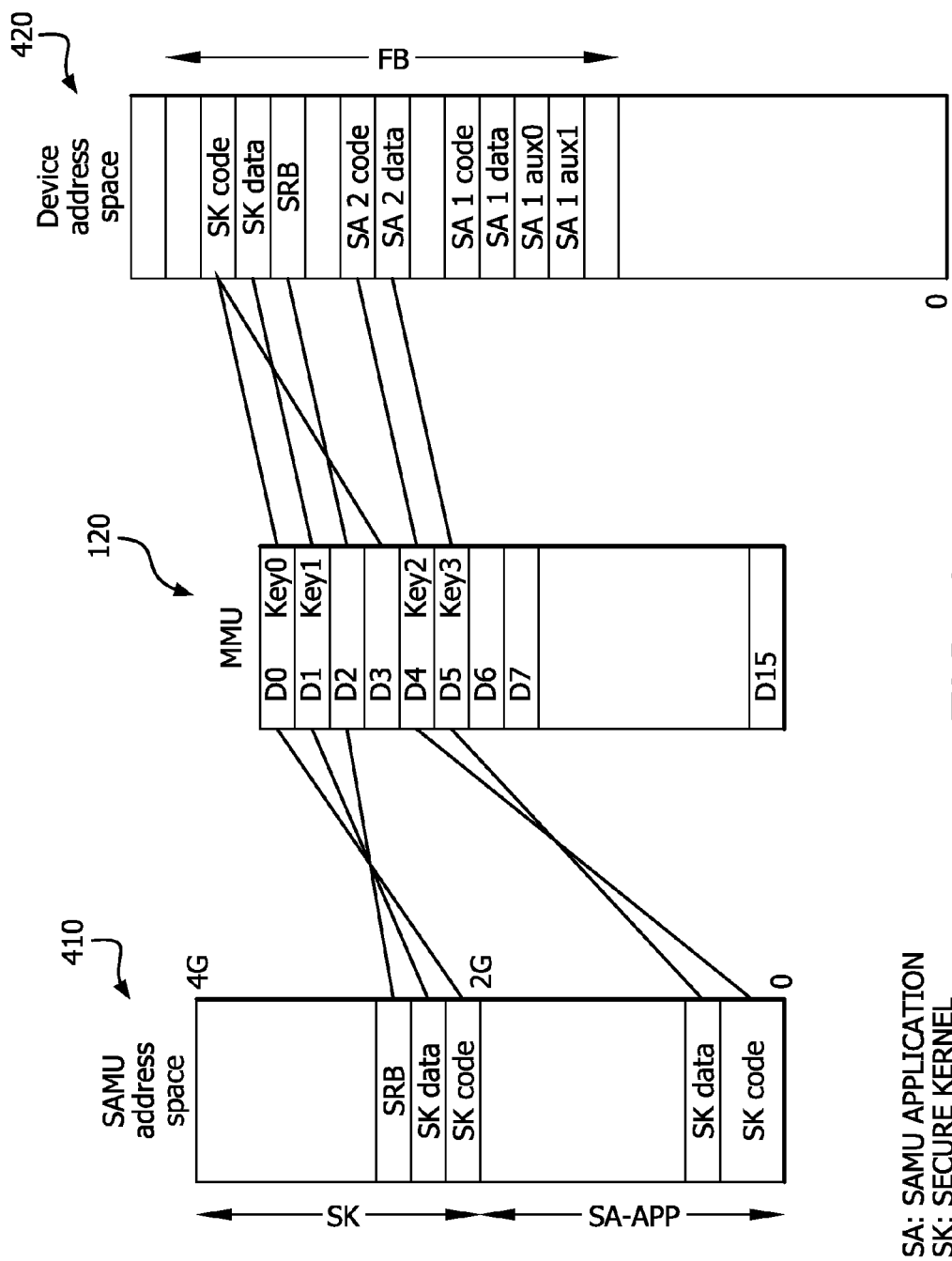
FIG. 4 shows an example of run-time memory management.

FIG. 4 shows an example of run-time memory management in the SAMU architecture. A SAMU virtual address 410 is mapped to a virtual address page table entry (D0-D15) in the MMU 120, which then maps the address to an entry in device address space 420 (e.g., GPU memory, a DSP memory, a FPGA memory, or other similar device).

In one embodiment, the virtual address page table is stored in hardware registers of the MMU 120 and is accessible only to the processor 180, instead of relying on external storage. One feature of this scheme is that multiple applications may be simultaneously managed. In this example, SA2 (in the SAMU address space 410 and device address space 420) and SA1 (in device address space 420) represent at least two applications, with SA2 being the active context serviced by the SAMU at that time.

Application of the page table entry is now described. The notation of a page table entry as being active or inactive, is used for hardware-based page translation. Different contexts typically consume a different number of page table entries, because it is too restrictive, from a software development perspective if all contexts must use the same number of memory segments. The per-entry flags provide flexibility to the kernel in memory management. The per-entry flags may also prevent a horizontal privilege violation, which occurs when two contexts assigned the same protection ring (the ring value is stored in a SAMU ring buffer as shown in the SAMU address space 410, SRB) gain access to pages belonging to another context.

The embodiments described herein use a SAMU to offload sensitive code from a host processor. The processor feeds sensitive data in protected form to the sensitive code running on the SAMU. For handling high-value premium content, the SAMU may provide content copy protection, demultiplexing, and extraction of audio and/or video packets, construction of audio and/or video elementary streams, and application of re-encryption before passing back control to the host and/or codec decoders for further processing.

The secure execution environment provided by the SAMU may be used to run sensitive code associated with copy protection schemes established for premium content consumption. An example of an environment where secure execution may be required is a Blu-ray™ disc player or Blu-ray™ player application running on a host. The Blu-ray™ disc player may be a part of a personal computer or a user device. A software vendor requires a secure execution environment for running a Blu-Ray™ disc, because the discs come with robust copy protection schemes that content creators rely upon for securing the content. The SAMU provides such an environment. The Blu-ray™ player may offload content protection functions (such as AACS and BD+ functions) to run on the secure environment. The protected Blu-ray™ content is loaded from an optical disc, but relies on AACS and BD+ functions in the secure environment to perform decryption and demultiplexing operations. A video bitstream may be re-encrypted with AES inside the secure environment for consumption by a video decoder. Audio bitstreams and other navigation data can be re-encrypted with AES for consumption by the player.

However, it should be clear to those skilled in the art that the application of the SAMU is not limited to Blu-ray™ disc players. The SAMU may be used in other hardware platforms including mobile phones, handheld accessories, positioning systems, and the like.

The SAMU is, in the described embodiments, a processor centric security platform. The processor may form part of another device—e.g., an integrated north bridge, an application processor, a central processing unit, a digital signal processor, or the like. Because the SAMU is a part of a processor, which offers codec acceleration, the key(s) for protecting the bitstream exiting from the SAMU may be used as input into the codec accelerator, and may travel from the SAMU to the codec accelerator without leaving the processor. This construction and operation may also improve security for premium content consumption.

The execution of sensitive code may be moved from a processor to the SAMU by detecting and utilizing security services provided as part of the SAMU kernel. Alternatively, sensitive code may be moved from a processor to the SAMU by presenting the code to an authorized driver from a semiconductor manufacturer as signed firmware. The SAMU may also be used in offloading other cryptographic operations, like authentication and the creation of digital signatures where access to a private key is needed. By moving these operations to the SAMU, the private key can be stored in encrypted form in the host system, and the plaintext value of the private key is only restored and consumed in the protected execution environment.

Use of the SAMU may improve overall system robustness and power efficiency. The SAMU provides a single point of trust verification in a processing architecture, such as within a processor, a GPU, a CPU, a DSP, or an FPGA. The SAMU only boots from encrypted and signed kernel code, and only executes encrypted and signed code. The SAMU hardware may run unsigned and in-the-clear (i.e., unencrypted) code. The SAMU is provided with a hardware-based secure boot and memory protection and is capable of executing on-demand code provided by a host processor.

A power efficient and cost effective secure execution environment is established by integrating, in one embodiment, a 32-bit RISC processor in the device (for example, the GPU platform) and adding security logic to it. Binaries for execution in this environment are encrypted with a randomly generated key and are signed at the same time by an offline tool. Protected binaries are provided in encrypted form with a driver and/or application and will stay in that form even when loaded in memory. Decryption is performed "on the fly" when sensitive code is loaded on demand into the instruction cache. This arrangement allows the use of existing memory available in a PC to store confidential information.

Sensitive code is protected by the offline signing tool. There are at least two kinds of sensitive code: the kernel that manages resource access, and user code that provides actual security related functions to host applications. The SAMU manufacturer may own the kernel, but the user code may come from either the SAMU manufacturer or external software vendors (who build applications for the SAMU). Separate signing tools may also be developed for these kinds of sensitive code.

Also, core functionalities of the SAMU may be provided to software vendors where the SAMU manufacturer provides development tools to software vendors, or where both the SAMU manufacturer and the software vendors develop a partitioning scheme and related APIs. In these situations, either the SAMU manufacturer or software vendor may generate on-demand firmware code.

Additionally, the embodiments described herein reduce randomization of research and development resources, alleviate retail pressure from returns, and enables premium broadcast on a personal computer platform. The premium content may include, for example, digital video broadcast-handheld, ARIB, etc. The embodiments described herein reduce power consumed on obfuscated and tamper resistant software usage, reduce frequency of revocation of valid software, and satisfy content owners by causing relatively low or little inconvenience to customers.

The embodiments described herein may be implemented in a processor core, which may be embodied in a CPU, a DSP, an FPGA, a GPU, or any combination thereof. Those skilled in the art would appreciate that the processor core may form part of another device, e.g., an integrated north bridge, an application processor, a CPU, a DSP, or the like.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Additionally, the present invention may be embodied in hardware, software, firmware, or any combination thereof. Embodiments of the present invention or portions thereof may be encoded in many programming language such as a hardware description language (HDL), assembly language, C language, netlists, etc. For example, an HDL, e.g., Verilog, may be used to synthesize, simulate, and manufacture a device, e.g., a processor, application specific integrated circuit (ASIC), and/or other hardware element, that implements the aspects of one or more embodiments of the present invention. Verilog code may be used to model, design, verify, and/or implement a processor that is capable of application of the SAMU.

Verilog, for example, may be used to generate a register transfer level (RTL) description of logic that can execute instructions for application of a SAMU. The RTL description of the logic may then be used to generate data, e.g., graphic design system (GDS) or GDS II data, used to manufacture the desired logic or device. The Verilog code, the RTL description, and/or the GDS II data may be stored on a computer readable medium. The instructions executed by the logic to perform aspects of the present invention may be coded in a variety of programming languages, such as C and C++, and compiled into object code that can be executed by the logic or other device.

Aspects of the present invention may be stored, in whole or in part, on a computer readable media. The instructions stored on the computer readable media can adapt a processor to perform the invention, in whole or in part, or be adapted to generate a device, e.g., processor, ASIC, or other hardware, that is specifically adapted to perform the invention in whole or in part. These instructions may also be used to ultimately configure a manufacturing process through the generation of maskworks/photomasks to generate a hardware device embodying aspects of the invention described herein.

What is claimed is:

1. A method for providing a secure execution environment for multiple instances of separate program code or data, comprising:

offloading multiple instances of separate code or data from a host processor to a secure asset management unit (SAMU) in an encrypted format for authenticating and for maintaining confidentiality of the multiple instances of separate code or data where the multiple instances are related to multiple applications and the SAMU simultaneously manages the multiple applications, wherein the host processor initially retrieves the code or data in encrypted format from a content source via an interface with an external device; and returning data from the SAMU to the host processor in re-encrypted format when protection is required and in decrypted format when protection is not required.

2. The method of claim 1, wherein the offloading includes creating an encrypted binary boot image with a random key generated in a signing tool for each instance of the multiple instances of separate code or data.

3. The method of claim 2, wherein the encrypted binary boot image is encrypted for the SAMU and is provided as a secure kernel and a secure application for the SAMU.

4. The method of claim 3, wherein a user installs the encrypted binary boot image and presents the encrypted binary boot image to the SAMU on demand.

5. The method of claim 4, further comprising:
validating the encrypted binary boot image for integrity before configuring a decryption key for use with the SAMU using a boot read only memory (ROM).

6. The method of claim 5, further comprising:
generating a decryption key at the boot ROM for use with the SAMU; and
passing control to the encrypted binary boot image in response to a positive validation.

7. The method of claim 6, wherein in response to a positive validation and execution of the secure kernel, an application for providing access to content detects availability of the SAMU hardware and the secure kernel generates a context for the application and validates the integrity of the application.

8. The method of claim 7, wherein a code decryption key for each of the multiple instances of separate code or data for the application is restored by the secure kernel in response to a positive validation for use with the context created with a kernel image.

9. The method of claim 8, further comprising:
generating a data cipher key randomly for the application at the secure kernel for each of the multiple instances of separate code or data in response to a positive validation of the kernel image.

10. The method of claim 5, wherein no SAMU service is exposed in response to a negative validation, and the application reverts to a software-based protection scheme.

11. A system for providing a secure execution unit for multiple instances of separate program code or data, comprising:

a host processor configured to execute a plurality of applications including code or data and to retrieve code or data in encrypted format from a content source via an interface with an external device; and a secure asset management unit (SAMU) configured to execute program code, wherein the SAMU is connected to the host processor and is configured to offload multiple instances of separate code or data from the host processor in an encrypted format for authenticating and for maintaining confidentiality of the multiple instances of separate code or data, where the multiple instances are related to multiple applications and the SAMU simultaneously manages the multiple applications, the SAMU further configured to return data to the host processor in re-encrypted format when protection is required and in decrypted format when protection is not required.

12. The system of claim 11, wherein the SAMU is further configured to create an encrypted binary boot image with a random key generated in a signing tool as part of the offloading multiple instances of separate code or data.

13. The system of claim 12, wherein the encrypted binary boot image is encrypted for the SAMU and provided as a secure kernel and a secure application for SAMU.

14. The system of claim 12, wherein a user installs the encrypted binary boot image and presents the encrypted binary boot image to the SAMU on demand.

15. The system of claim 14, wherein the SAMU is further configured to validate the encrypted binary boot image for integrity before configuring a decryption key for use with the SAMU using a boot read only memory (ROM).

16. The system of claim 15, wherein the boot ROM is further configured to generate a decryption key for use with the SAMU and to pass control to the encrypted binary boot image in response to a positive validation.

17. The system of claim 16, wherein in response to a positive validation and execution of the secure kernel, an application for providing access to content detects availability of the SAMU hardware and the secure kernel generates a context for the application and validates the integrity of the application.

18. The system of claim 17, wherein a code decryption key for each of the multiple instances of separate code or data for the application is restored by the secure kernel in response to a positive validation for use with the context created with a kernel image.

19. The system of claim 18, further configured to:
generate a data cipher key randomly for the application at the secure kernel for each of the multiple instances of separate code or data in response to a positive validation of the kernel image.

20. The system of claim 15, wherein no SAMU service is exposed in response to a negative validation, and the application falls back on software based protection scheme for authentication.

21. A non-transitory computer-readable storage medium storing a set of instructions for execution by one or more processors to facilitate manufacture of a secure asset management unit (SAMU), the SAMU configured to:
execute program code;
offload multiple instances of separate code or data from a host processor in an encrypted format to authenticate and to maintain confidentiality of the multiple instances of separate code or data, where the multiple instances are related to multiple applications and the SAMU simultaneously manages the multiple applications, wherein the content source for the offloaded code or data is an external device having an interface with the host processor; and
return data to the host processor in re-encrypted format when protection is required and in decrypted format when protection is not required.

22. The computer-readable storage medium of claim 21, wherein the instructions are hardware description language (HDL) instructions used for the manufacture of a device.

* * * * *